(12) United States Patent
Ballu

(10) Patent No.: US 9,445,540 B2
(45) Date of Patent: Sep. 20, 2016

(54) DEVICE AND METHOD FOR DISPENSING A LIQUID PRODUCT THAT IS TO BE SPRAYED ONTO A SURFACE

(75) Inventor: Patrick Jean Marie Ballu, Reims (FR)

(73) Assignee: EXEL INDUSTRIES, Epernay (FR)

( * ) Notice: Subject to any disclaimer, the term of this patent is extended or adjusted under 35 U.S.C. 154(b) by 665 days.

(21) Appl. No.: 13/817,764

(22) PCT Filed: Jul. 29, 2011

(86) PCT No.: PCT/FR2011/051842
§ 371 (c)(1),
(2), (4) Date: Feb. 19, 2013

(87) PCT Pub. No.: WO2012/022903
PCT Pub. Date: Feb. 23, 2012

(65) Prior Publication Data
US 2013/0153676 A1 Jun. 20, 2013

(30) Foreign Application Priority Data

Aug. 18, 2010 (FR) ...................................... 10 56644
Sep. 10, 2010 (FR) ...................................... 10 57215

(51) Int. Cl.
*A01C 23/00* (2006.01)
*A01C 23/04* (2006.01)
(Continued)

(52) U.S. Cl.
CPC ........... *A01C 23/007* (2013.01); *A01C 23/047* (2013.01); *A01M 7/0042* (2013.01); *A01M 7/0089* (2013.01); *B05B 12/006* (2013.01)

(58) Field of Classification Search
CPC . B05B 12/006; B05B 12/008; B05B 12/085; B05B 12/087; B05B 12/126; A01C 23/007; A01C 23/047
See application file for complete search history.

(56) References Cited

U.S. PATENT DOCUMENTS 3,782,634 A * 1/1974 Herman .................... 239/156
3,933,277 A * 1/1976 Volat et al. .................. 222/627
(Continued)

FOREIGN PATENT DOCUMENTS

DE 69817421 T2 6/2004
DE 202007011631 U1 11/2007
(Continued)

OTHER PUBLICATIONS

International Search Report issued Dec. 29, 2011 re: PCT/FR2011/051842; pp. 4; citing: JP 9 313085 A and US 5 971 294 A.
(Continued)

*Primary Examiner* — Ryan Reis
(74) *Attorney, Agent, or Firm* — Cantor Colburn LLP

(57) ABSTRACT

The device according to the invention comprises a bar that includes several consecutive ducts with at least one inlet connected to a source of the liquid product and outlets communicating with nozzles. The device further comprises several sensors for measuring a physical property making it possible to determine a pressure difference between ducts or a pressure in one respective duct, several members designed to vary the pressures inside respective ducts, as well as at least one control unit estimating the pressure differences between ducts and driving the members to reduce those pressure differences or equalize those pressures. This device thus limits the pressure differences, and therefore flow differences, of the liquid product between the nozzles, in particular between the ends of very long bars moving over significant bankings.

19 Claims, 4 Drawing Sheets

(51) Int. Cl.
  *B05B 12/00* (2006.01)
  *A01M 7/00* (2006.01)

(56) References Cited

U.S. PATENT DOCUMENTS

| | | | |
|---|---|---|---|
| 5,520,333 A * | 5/1996 | Tofte | 239/10 |
| 5,911,362 A | 6/1999 | Wood et al. | |
| 5,971,294 A * | 10/1999 | Thompson et al. | 239/76 |
| 2002/0099471 A1* | 7/2002 | Benneweis | 700/237 |
| 2006/0273189 A1* | 12/2006 | Grimm et al. | 239/146 |

FOREIGN PATENT DOCUMENTS

| | | |
|---|---|---|
| EP | 1154685 B1 | 11/2001 |
| EP | 1189704 B1 | 3/2002 |
| JP | 9-313085 A | 12/1997 |
| JP | 9313085 A | 12/1997 |

OTHER PUBLICATIONS

Written Opinion issued Dec. 29, 2011; re PCT/FR2011/051842; pp. 4; citing: JP 9 313085 A.

* cited by examiner

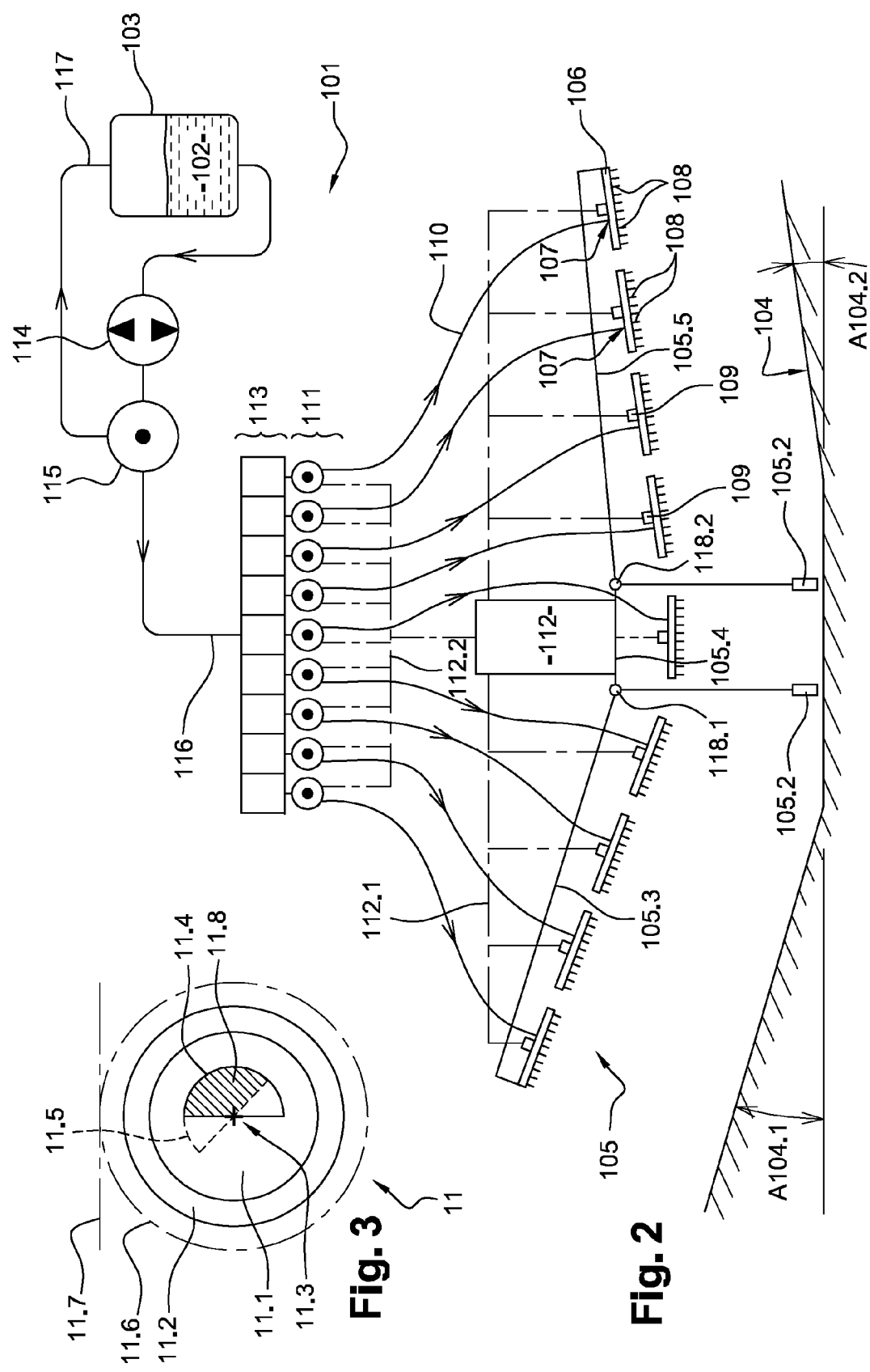

DEVICE AND METHOD FOR DISPENSING A LIQUID PRODUCT THAT IS TO BE SPRAYED ONTO A SURFACE

TECHNICAL FIELD

The present invention relates to a device and a method for dispensing a liquid product to be sprayed on a surface, such as an agricultural field.

BRIEF DESCRIPTION OF RELATED ART

The present invention is applicable in the agricultural field in order to spray a field with a liquid phytosanitary product, such as a fertilizer or a biocide of the herbicide, insecticide, fungicide, or other type.

A dispensing device of the prior art comprises a conventional spraybar or bar, which comprises several consecutive ducts, each forming a longitudinal section of the bar and having a supply inlet and outlets connected to nozzles adapted to spray the liquid product on a target, in general on the ground or plants, approximately 70 cm away. The bar is supplied with liquid product by a pump, which suctions liquid product from a source and discharges it into several supply conduits respectively connected to the inlets of the ducts. Generally, the pump is coupled to a bypass valve so as to bring the liquid product upstream of the supply conduits to a pressure proportional to the square of the speed of travel of the bar on the agricultural field, which ensures a constant overall flow rate of sprayed liquid product per treated surface unit.

A conventional bar may be up to 24 m long, or even 48 m. On a flat agricultural field, the bar is also horizontal and all of the nozzles are situated at the same height relative to the ground. However, many agricultural fields have a non-planar topography, with raised areas such as a slope or banking, a peak, a thalweg, etc. A conventional bar therefore generally includes means for adjusting the height of the ducts to the topology of the agricultural field, such that their outlets and associated nozzles are situated at different heights from one another.

However, the altimetric differences between the nozzles create pressure differences that depend on the height of the column of liquid separating them and the density of the liquid. The flow rate of the nozzle being proportional to the square root of the pressure, the flow rate of liquid product differs on each nozzle, such that the liquid product is not uniformly sprayed on each surface unit.

For example, in the case of a conventional rectilinear bar 36 m long moving over an 11% banking to spray a liquid fertilizer with a density of 1.32 at an average pressure of 1.5 bars, the nozzle situated at the lower end of the bar withdraws 18% more liquid fertilizer than the nozzle situated at the upper end of the bar, since the height difference of 3.9 m causes a difference between hydrostatic pressures at those nozzles, which are respectively 1.76 bar and 1.24 bar. Such a flow rate difference causes a major irregularity (18% in this example) in the treatment of the agricultural field between two consecutive shared passages, and therefore growth differences between adjacent plants of less than 1 m. Furthermore, certain standards require a maximum gap of 10% between the volumes of liquid product that are sprayed onto surface units during a same spraying operation. Farmers often require that that gap be limited to only 5%.

BRIEF SUMMARY

One aim of the present invention is to resolve all or part of the aforementioned problems.

To that end, the invention relates to a device for dispensing a liquid product to be sprayed over a surface such as an agricultural field, the device comprising a bar for spraying the liquid product, the bar including several consecutive ducts, each duct forming a longitudinal segment of the bar and having:
  at least one inlet port designed to be in fluid communication with at least one liquid product source; and
  at least one outlet port adapted to be in fluid communication with at least one nozzle.
The device is characterized in that it further comprises:
  sensors linked to respective ducts, each sensor being suitable for measuring a physical property making it possible to determine a pressure difference between two respective ducts or a physical property making it possible to determine a pressure inside a respective duct;
  several members designed to vary the pressures inside the respective ducts, each member being in fluid communication with at least one inlet port; and
  at least one control unit interconnected with the sensors so as to estimate the pressure differences between at least two ducts, said control unit being interconnected with the members so as to drive them to reduce said pressure differences or equalize said pressures.

In other words, in a device according to the invention, the members generate pressure drops that compensate for the pressure differences between the nozzles as estimated by a control unit receiving measurements taken by the sensors linked to the respective ducts. The measured physical properties allow the control unit to determine a pressure difference between two respective channels; such a physical property may for example be the angle that the bar or its arms form with the horizontal. Alternatively, the measured physical properties allow the control unit to determine a pressure inside a respective ducts; such a physical property may for example be the hydrostatic pressure inside that duct.

Thus, the device according to the invention makes it possible to limit the pressure differences, and therefore the flow rate differences, of liquid product between the nozzles of a bar, and therefore the differences in the volume of liquid product sprayed by those nozzles over surface units on a same agricultural field.

According to one embodiment, the control unit is designed to drive the members so as to limit said pressure differences to less than 10%, and preferably less than 5%.

Thus, inasmuch as the output flow rate of the nozzle is proportional to the square root of the pressure of the liquid product, such a control unit limits the flow rate differences to less than 5%, preferably less than 2.5%.

According to one embodiment, the sensors comprise pressure sensors, preferably attached on respective ducts.

In this way, such pressure sensors directly provide a measurement of the pressures inside the respective ducts, which reduces the number of calculations that must be done by the control unit. The control unit therefore has pressure differences between nozzles. Attaching the pressure sensors on the respective ducts makes it possible to renovate existing devices and bars.

According to one embodiment, the sensors comprise at least one inclinometer.

Thus, the height differences may either be calculated, from physical properties measured by one or more inclinometers, and the control unit can deduce the pressure differences between nozzles therefrom.

According to one embodiment, the members comprise members for restricting the flow of the liquid product, such as needle regulators, sliding gate valves, ice sluices or proportional solenoid valves, or hose clamps.

Thus, such flow rate restricting members can create pressure drops compensating for the height differences, by increasing the hydrostatic pressures at the uppermost nozzles, which equalizes the flow rates between nozzles.

According to one embodiment, at least one flow restricting member includes two discs coaxially juxtaposed, each disc being pierced with an orifice that is asymmetrical relative to the axis of the discs, the discs being rotatable around the shared axis under the action of a driving member, for example an electric motor.

Thus, such a flow restricting member makes it possible to adjust the flow rate of liquid product precisely and quickly.

According to one embodiment, each duct is linked to a sensor and each inlet port is in fluid communication with a member.

Thus, the control unit has measurements done for each duct. The compensation of the pressure differences is then particularly precise.

According to one embodiment, the bar further includes connecting conduits arranged such that two consecutive ducts are connected by a respective connecting duct and such that the connecting conduits form at least one bar portion equipped with several ducts connected in series, the bar including one or more of said bar portions arranged in parallel, and at least one member is arranged between the ducts connected in series.

Thus, such a bar has a relatively non-bulky and lighter structure, as it requires fewer conduits. The nozzles can advantageously be actuated alone or in a group, by electrical or pneumatic signals.

According to one embodiment, the device further comprises two supply conduits respectively coupled to the two ducts arranged at each end of the bar or of a bar portion, in that the bar or each bar portion also includes two members or two cutoff valves, each member or cutoff valve being arranged to selectively allow a flow of liquid product in a respective supply conduit or to create a predetermined pressure drop.

Thus, it is possible to supply the bar or each bar portion with liquid product with a relatively high flow rate by its upper end or its lower end, which facilitates equalization of the pressures respectively inside each duct, and therefore to equalize the flow rates sprayed by the nozzles.

According to one embodiment, the device further comprises several supply conduits designed to be connected in parallel to at least one liquid product source, each supply conduit being in fluid communication with at least one respective member, the member preferably being coupled in the upstream region of a respective supply conduit.

Thus, the control unit can drive a member for each conduit. The compensation of the pressure differences is then particularly precise.

According to one embodiment, at least two supply conduits are coupled to a same member.

This thereby limits the number of members required.

According to one embodiment, the device also comprises at least one actuator that is linked to the bar and that is adapted to vary the incline angle of the bar so as to follow the topography of said surface, in particular its bankings.

Thus, the bar of such a device can tilt in its entirety to follow a banking, for instance. Such an actuator, for example a cylinder, may be driven by a hydraulic or pneumatic force.

According to one embodiment, the device also comprises:
a central frame;
several moving arms, each moving arm supporting at least one duct;
connecting elements between the central frame and the moving arms, each connecting element allowing relative pivoting of a moving arm with respect to the central frame.

Thus, the bar of such a device is made up of several arms pivoting independently to follow a thalweg or a peak, for example. In this case, the nozzles of two adjacent ducts can have significant height variations, while the device according to the invention compensates the pressure differences caused.

According to one embodiment, the device further comprises a supply circuit located upstream from the supply conduits, the supply circuit being designed to withdraw the liquid product in proportion to the movement speed of the bar over the surface.

Thus, the total volume of liquid product sprayed per surface unit remains constant when the bar slows down or speeds up.

According to one embodiment, at least one from among the set of sensors and the set of members forms a multiplexed network interconnected by a bus.

Thus, the signals or data are transmitted quickly between the control unit on the one hand and the sensors and/or members on the other hand, and using a simplified cable including a small number of conductive wires.

According to one embodiment, each sensor and each member are incorporated into a single and same component, the set of components being interconnected between them by a same cable forming a multiplexed network and providing electricity.

According to one embodiment, the member further incorporates means for cutting the arrival of fluid into the associated duct.

Furthermore, the present invention relates to a method for dispensing a liquid product to be sprayed over a surface such as an agricultural field, the device comprising a bar for spraying the liquid product, the bar having several consecutive ducts, each duct forming a longitudinal segment of the bar and having:
at least one inlet port designed to be in fluid communication with at least one liquid product source; and
at least one outlet port suitable for being in fluid communication with at least one nozzle.

The method is characterized in that it comprises the following steps:
measuring a physical property making it possible to determine a pressure inside a respective duct using several sensors linked to respective ducts;
estimating the pressure differences between at least two ducts by means of a control unit, which is centralized or specific to each sensor, and which is interconnected with the sensors;
varying the pressures inside the respective ducts using members that are respectively in fluid communication with at least one of said inlet ports and which are driven by the control unit as a function of said pressure differences.

Thus, a method according to the invention makes it possible to limit the pressure differences of the liquid product between the nozzles of a bar, therefore the differences in the volume of liquid product sprayed by those nozzles over surface units of a same agricultural field.

According to one embodiment, a method according to the invention further comprises the following steps:
- checking whether a pressure at a duct is above a predetermined threshold, preferably 0.5 bar;
- if said pressure is above the predetermined threshold, driving the member corresponding to said duct normally; and
- if said pressure is below the predetermined threshold, keeping the member corresponding to said duct in its prior state and, preferably, with a maximum flow section.

Thus, when each nozzle is equipped with a spill proof system, with a membrane mounted on a spring, the estimation of the pressure differences between the ducts accounts for the residual back pressures generated by the spill proof systems.

According to one embodiment, a method according to the invention further comprises the following steps:
- implementing a device as previously stated with pressure sensors;
- associating the device with a pressure or flow regulating unit, designed to modulate the total flow rate of the sprayed liquid product as a function of the forward speed of the device on the surface;
- calculating, regularly and using the control unit, the gap between an average value of the pressure measured by the sensors and the pressure caused by said regulating unit; and
- driving each member so as to keep said gap below a predetermined value.

One thus avoids a pressure increase of the device by drift or "seizing" of the control unit, because the regulation is done as a priority through a pressure reduction, then a pressure increase if necessary.

According to one embodiment, each member is driven with an opening speed greater than the closure speed.

One thus avoids a pressure increase of the device by drift or "runaway" of the control unit, because the regulation of the pressure drop by each of the members is done as a priority through a pressure reduction, then a pressure increase only if necessary.

According to one embodiment, a method according to the invention may further comprise the following step: if the physical property measured by a sensor establishes that a pressure inside a target duct differs abnormally and simultaneously from the pressures in two adjacent ducts, using the control unit to generate a signal identifying the target duct so as to inform an operator that a clog may have occurred in or near the target duct, for example at a filter and/or a nozzle. As an example of an abnormal difference, the pressures in the adjacent ducts may both be above or, on the contrary, below the pressure in the target duct.

Thus, the operator performs corrective maintenance more quickly and precisely. This pressure difference may be set at a significant value. Two clogs may arise: if a filter mounted on the duct is clogged, then the pressure inside the target duct decreases abnormally relative to that of its adjacent ducts. Conversely, if nozzles clog, the pressure inside the target channel increases abnormally relative to that of its adjacent ducts. In both cases, a signal identifying the target duct informs the operator of the clog. This method is implemented both with a bar having serial ducts and with a bar having parallel ducts.

BRIEF DESCRIPTION OF THE DRAWINGS

The present invention will be understood, and the advantages thereof will also appear in light of the following description, which is provided solely as a non-limiting example and which is done in reference to the appended drawings, in which:

FIG. 2 is an illustration similar to FIG. 1 of a device according to a second embodiment of the invention;

FIG. 3 is a cross-sectional view of part of a flow restricting member designed to equip the device of FIG. 1 or 2;

DETAILED DESCRIPTION

Figure 1:
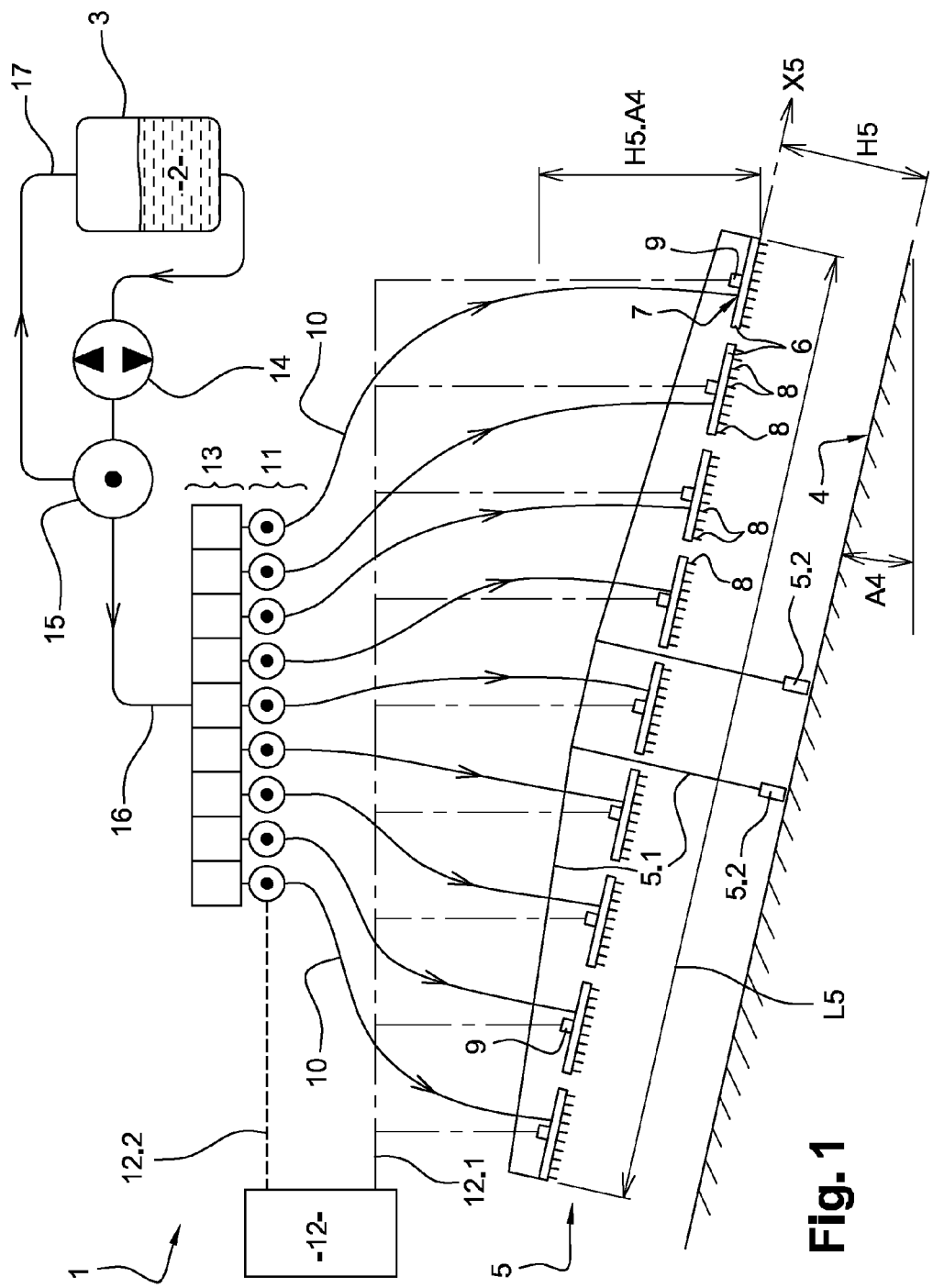
FIG. 1 is a diagrammatic, therefore not to scale, illustration of a device according to a first embodiment of the invention.

FIG. 1 illustrates a device 1 for dispensing a liquid product 2, which is contained in a reservoir 3 and which must be sprayed over a surface 4, such as farmland. The device 1 comprises a spray boom or spraybar or bar 5 for spraying a liquid product 2. The bar 5 is supported by a chassis 5.1 and wheels 5.2 to roll on the surface 4. The wheels 5.2 travel along lines provided with no seeds or plants. The bar 5 can have a length L5 of approximately 36 m, for example.

In the present application, the expression "liquid product" refers to a product comprising a liquid phase. The liquid product 2 may be of any nature, for example a phytosanitary product such as a fertilizer or biocide of the herbicide, insecticide, fungicide, etc. type.

The bar 5 includes nine ducts, one of which is identified in FIG. 1 using reference 6 and which are consecutive in the longitudinal direction X5 of the length L5 of the bar 5. In the example of FIG. 1, these nine ducts are collinear to the longitudinal direction X5. The ducts 6 and equivalent means are supported by the chassis 5.1. Since these nine ducts are similar, the description of the duct 6 provided above relative to FIG. 1 can be transposed to the other eight ducts illustrated in FIG. 1.

The duct 6 forms a longitudinal segment of the bar 5. The segments are generally 3 m, 3.5 m or 4 m long, that length being defined by the spreaders. The duct 6 has one inlet 7 and eight outlets. The inlet 7 is formed by a port designed to be in fluid communication with the reservoir 3, as described below. The eight outlets are formed by eight ports suitable for being in fluid communication with the nozzles 8, respectively, which are typically spaced 50 cm apart in the longitudinal direction X5. The nozzles 8 and equivalent means make it possible to spray the liquid product on the surface 4 that forms a target. The target may be the ground or plants. The distance H5 of the nozzles 8 from the surface 4, measured perpendicular to the longitudinal direction X5, varies, and is preferably 70 cm, more generally comprised between 40 cm and 100 cm.

In the example of FIG. 1, the surface 4 has a banking of approximately 11%, which is shown by an angle A4 intentionally amplified in FIG. 1. The device 1 comprises actuators (not shown), which are linked to the bar 5 and which are suitable for varying the incline angle of the bar 5 so as to follow the topography of the surface 4, in particular its bankings. Such actuators may be formed by hydraulic cylinders. Inasmuch as the bar 5 has a length L5 of approximately 36 m, the bar 5 has a height difference H5.A4 of 3.6 m between the nozzles situated at the lateral ends of the bar 5.

The device 1 also comprises nine pressure sensors linked to respective ducts. In FIG. 1, the duct 6 is linked to a pressure sensor 9. Because these nine pressure sensors are similar, the description of the pressure sensor 9 provided below relative to FIG. 1 may be transposed to the other eight pressure sensors illustrated in FIG. 1.

The pressure sensor 9 forms a sensor suitable for measuring a physical property making it possible to determine a pressure in the duct 6, to which it is linked. In the example of FIG. 1, each pressure sensor 9 or equivalent means is formed by a manostat or a pressostat. Each pressure sensor 9 or equivalent means is attached on the respective duct 6.

The device 1 further comprises supply conduits 10, downstream of which the inlets 7 of the ducts 6 and equivalent means are coupled. The supply conduits 10 serve to supply the ducts 6 with liquid product 2.

Upstream of each supply conduit 10, a cutoff valve 13 is coupled that allows or blocks the flow of liquid product in the respective supply conduit 10. In the example of FIG. 1, each cutoff valve 13 is formed by a solenoid valve or other motorized valve.

A pump 14 is installed downstream from the reservoir 3 so as to pressurize, therefore set in motion, the liquid product 2. The pump 14 serves to pressurize, therefore set in motion, the liquid product 2 to ensure that it flows to the nozzles 8.

The supply conduits 10 are designed to be connected in parallel to the reservoir 3, by means of the pump 14 and a respective cutoff valve 13.

In the present application, the verbs "couple," "connect," "supply" and their derivatives relate to the fluid communication, i.e., the liquid flow, between two remote elements. Furthermore, the terms "upstream" and "downstream" refer to the direction of flow of the liquid product in the device according to the invention, from the liquid product source to the outlets in the nozzles.

Furthermore, the device 1 comprises flow restricting members 11 for the liquid product 2. The members 11 are designed to generate different pressure drops, so as to vary and equalize the pressures inside the respective ducts 6.

The flow restricting members may comprise needle regulators, sliding gate valves, ice sluices or proportional solenoid valves, or hose clamps.

The structure of a specific member 11 is described below relative to FIG. 3.

Each member 11 is coupled downstream from an inlet 7 of the duct 6, by means of a conduit 10, and upstream to a shared conduit 16, by means of a cutoff valve 13.

Each member 11 is coupled in the upstream region of the respective supply conduit 6, in particular at its upstream end in the example of FIG. 1. Each member 11 is in fluid communication with an inlet 7 by means of a supply conduit 10. In other words, each supply conduit 10 is in fluid communication with at least one member 11. In the example of FIG. 1, each duct 6 is linked to a pressure sensor 9 and each inlet 7 is in fluid communication with a member 11.

In one advantageous embodiment, the member 11 itself performs the supply cutoff function for the duct 6, instead of the cutoff valve 13, forming a single component. In that embodiment, each member 11 is coupled directly upstream from the shared conduit 16.

The device 1 further comprises a control unit 12 that is interconnected with the sensors 9 so as to evaluate the pressure differences between at least two ducts 6. The control unit 12 is also interconnected with the members 11 so as to drive them according to those pressure differences that the control unit 12 assesses. The control unit 12 can be placed onboard the bar 5 or away from the bar 5, for example onboard an engine (not shown) that supports the chasses of the bar 5.

The control unit 12 here is designed to drive the members 11 so as to limit those pressure differences to 10%, and preferably less than 5%.

In the present application, the verb "interconnect" and its derivatives relate to the transmission of electrical, magnetic or electromagnetic signals. This signal transmission may be done with or without a wire and using a direct or indirect interconnection, i.e., using no components, or one or several component(s).

In FIG. 1, the transmission of signals between the sensors 9 and equivalent means and the control unit 12 is embodied by dotted lines 12.1 and the transmission of signals between the control unit 12 and the members 11 is embodied by dotted lines 12.2.

In the example of FIG. 1, the set of pressure sensors 9 forms a multiplexed network interconnected by a bus. Likewise, the set of members 11 forms a multiplexed network interconnected by a bus. The transmission of signals along the lines 12.1 or 12.2 is therefore done using the bus.

Such a bus makes it possible to limit the number of electrical wires generally to four, which creates a light, cost-effective network that is easy to install and maintain.

A bypass valve 15, as known as for DPA regulation, is connected downstream from the pump 14. The bypass valve 15 is connected on the one hand to the cutoff valves 13 and/or the members 11, using the shared conduit 16 and, on the other hand, to the reservoir 3, or directly upstream from the pump 14, to lead part of the liquid product 2 back therethrough using a return conduit. The bypass valve 15 serves to regulate the flow rate of the liquid product 2 in proportion to the speed of movement of the bar 5 over the surface 4. Thus, the entire supply circuit located downstream of the shared conduit 16 withdraws the liquid product 2 in proportion to the speed of movement of the bar 5 over the surface 4, i.e. in DPA.

During operation, a method according to the invention for dispensing the liquid product 2 to be sprayed over the surface 4 comprises a step for measuring a physical property making it possible to determine a pressure inside a respective duct 6 using several pressure sensors 9 connected to the respective ducts 6. In the case of a pressure sensor 9, this physical property is directly the pressure inside the respective duct 6.

Then, in the method according to the invention, the pressure differences between two ducts 6 are estimated using the control unit 12 that is interconnected with the pressure sensors 9. In the example of FIG. 1, the height difference H5.A4 causes a pressure difference exceeding 0.5 bar between the ducts situated at the lower and upper lateral ends of the bar 5.

Next, the control unit 12 drives the members 11 to vary the pressures inside the respective ducts 6 according to the pressure differences previously estimated, so as to bring those pressures close to the average of those pressures (excluding pressures below the predetermined threshold). The pressures are measured regularly so as to gradually minimize any pressure difference caused by the incline variations of the bar 5 that moves forward over the surface.

The average pressure generated by the pump 14 is regulated in the shared conduit 16 by the bypass valve 15, so as to ensure a Rate Proportional to Advance (DPA), for example of 120 L/h of liquid product 2. The flow over the entire bar 5 is dispensed by the members 1 in the nozzles 8 uniformly and independently of the angle A4 that forms the banking of the surface 4.

Thus, each nozzle 8 or equivalent means sprays a same flow of liquid product 2 per unit of the surface 4, for example 120 L/h, despite the variations in the topography of the surface 4.

Furthermore, according to one method according to the invention, the control unit 12 can carry out the following steps:
- checking whether a pressure difference is above a predetermined threshold, for example 0.5 bar, which represents the maximum residual back pressure generated by a spill proof system equipping the nozzles;
- if the pressure difference is above the predetermined threshold, driving the members 11; and
- if the pressure difference is below the predetermined threshold, keeping the members 11 in their prior state; alternatively, the members may be opened maximally to eliminate any restriction, which prepares them for later operations.

It should be noted that certain components of the device 1, in particular the pressure sensors 9 and the members 11, can be attached on an existing bar to renovate it. With a simple electricity provision, the entire device can be installed on a bar to be renovated, independently of any existing driving or electric or electronic regulation system.

FIG. 2 illustrates a device 101 according to a second embodiment of the invention. As far as the device 101 is similar to the device 1, the description of the device 1 provided above relative to FIG. 1 can be transposed to the device 101, with the exception of the differences hereafter described. An element of the device 101 that is similar or corresponds, in terms of structure or function, to an element of the device 1 bears the same reference number increased by 100.

One thus defines a liquid product 102, a reservoir 103, a surface 104, a bar 105 with wheels 105.2, ducts 106, inlets 107, nozzles 108, supply ducts 110, members 111, a control unit 112, cutoff valves 113, a pump 114, a bypass valve 115, a shared conduit 116 and a return conduit 117.

The device 101 differs from the device 1, because the chassis of the bar 105 has a variable geometry, i.e., it comprises a central frame 105.4 and two moving arms 105.3 and 105.5, as well as connecting means 118.1 and 118.2 between the central frame and the moving arms 105.3 and 105.5. Each connecting means 118.1 and 118.2, which is for example made up of a hydraulic cylinder, allows relative pivoting between the central frame 105.4 and each moving arm 105.3 and 105.5. In the example of FIG. 2, the central frame bears a segment and each moving arm 105.3 and 105.5 supports four ducts 6 and equivalent means.

Thus, the bar 105 can follow a more complex topography of the surface 104, making it possible to maintain a substantially constant distance from the target, which improves the uniformity of the spraying of the liquid product 102 and, in case of wind, prevents the smallest drops from being sent toward other crops.

In the example of FIG. 2, the surface 104 is formed by a thalweg, the central region of which is substantially horizontal and the lateral regions of which form respective bankings A014.1 and A104.2 of approximately 11% and 5%.

Furthermore, the device 101 differs from the device 1, because the control unit 112 is onboard the bar 5. The control unit 112 is fastened on the central frame 105.4 of the bar 5.

According to one alternative embodiment, the device 1 could also be built with the control unit 12 onboard the central frame.

Additionally, the device 101 differs from the device 1 in that each sensor for measuring a physical property making it possible to determine a pressure inside a respective duct 106 is formed by an inclinometer 109. Each inclinometer 109 is linked to a respective duct 106. In this case, each inclinometer 109 is fastened on a respective moving arm 105.3 and 105.5.

In this application, the term "linked" and its derivatives indicate that a sensor is mounted on or associated with at least one duct. Thus, in the device 1, a pressure sensor 9 is in fluid communication with a duct 6, in this case directly tapped on the duct 6. In the device 101, the inclinometer 109 is simply fixed or mounted on a duct 106. Alternatively, the inclinometer 109 can be mounted on a moving arm, therefore associated with a duct 106.

Each inclinometer 109 measures the angle formed by a respective moving arm 105.3 and 105.5 on the horizontal, due to the bankings A104.1 and A104.2. The control unit 112 calculates the altimetric difference between two ducts 106, then calculates the pressure difference between those ducts 106, from the bankings A104.1 and A104.2, the density of the liquid product 102, the position of the duct 106 relative to the other ducts 106. The control unit 112 can then drive the members 111 to vary and equalize the pressures inside the different respective ducts 106 as a function of the pressure differences previously estimated.

FIG. 3 illustrates a flow restricting member 11 that is designed to equip the device 1 or 101. The member 11 includes two discs 11.1 and 11.2 juxtaposed coaxially with a shared axis 11.3. Each disc 11.1 or 11.2 is pierced with a port 11.4 or 11.5 that is asymmetrical relative to the shared axis 11.3. Alternatively, each port can have a shape other than semi-circular, for example oval, oblong, elongated or circular off-centered opening.

The discs 11.1 and 11.2 are rotatable around their shared axis 11.3. To that end, the periphery of the disc 11.2 is provided with toothings that form a meshing 11.6 diagrammed by a line with a circular axis. The meshing 11.6 is designed to be driven by a worm screw 11.7 diagrammed by its axis in FIG. 3. The worm screw 11.7 forms a driving member for the discs 11.1 and 11.2.

When the discs 11.1 and 11.2 rotate relative to one another, their ports 11.4 and 11.5 more or less overlap so as to define a variable flow cross-section 11.8 as a function of the degree of rotation of the discs 11.1 and 11.2. In this way, this assembly forms a member 11 designed to vary and equalize the pressures in respective ducts.

Figure 4:
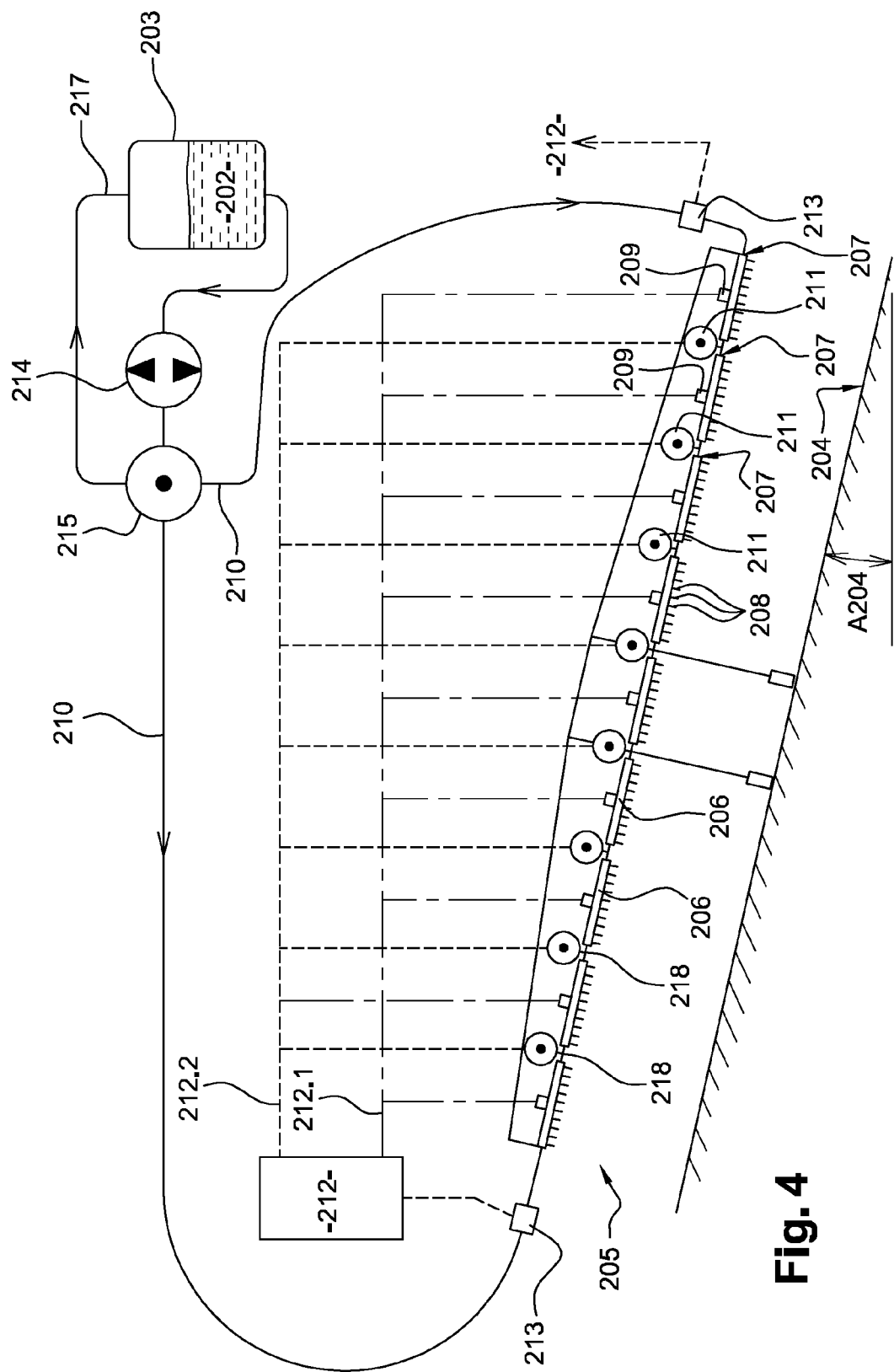
FIG. 4 is an illustration similar to FIG. 1 of a device according to a third embodiment of the invention.

FIG. 4 illustrates a device 201 according to a second embodiment of the invention. As far as the device 201 is similar to the device 1, the description of the device 1 provided above relative to FIG. 1 can be transposed to the device 201, with the exception of the differences hereafter described. An element of the device 201 that is similar or corresponds, in terms of function or structure, to an element of the device 1 below bears the same numerical reference increased by 200.

One thus defines a liquid product 202, a reservoir 203, a surface 204 with an angle A204, a bar 205, ducts 206, inlets 207, nozzles 208, supply ducts 210, members 211, a control unit 212, cutoff valves 213, a pump 214, a bypass valve 215 and a return conduit 217.

The device 201 differs from the device 1 in that the bar 205 also includes connecting conduits 218, which are arranged such that two successive ducts 206 are connected by a respective connecting conduit 218. In other words, the ducts 206, which each form a longitudinal segment of the bar 205, are mounted in series. On the contrary, the ducts 6 and 106 respectively illustrated in FIGS. 1 and 2 are arranged in parallel.

Each member 211 is arranged between two successive ducts 206. To facilitate the reading of FIG. 4, the members 211 are shown above the connecting conduits 218. However, each member 211 is advantageously arranged directly on the central part of a respective connecting conduit 218. In the example of FIG. 4, each member 211 is formed by a flow restrictor.

Furthermore, the device 201 differs from the device 1, as it also comprises two supply conduits 210. The supply conduits 210 are respectively coupled to the two ducts 206 arranged at each end of the bar 205, i.e., respectively on the right and left of FIG. 4.

Furthermore, the bar 205 includes two cutoff valves 213. Each cutoff valve 213 is arranged to selectively allow a flow of liquid product 202 into a respective supply conduit 210. Each cutoff valve 213 is driven by the control unit 212.

Furthermore, the device 201 differs from the device 1, as it lacks a shared conduit downstream of the bypass valve 215.

During operation using a method according to the invention, the surface 204 can have a banking, which is embodied in FIG. 4 by an angle A204. In the case of a bar 205 without an articulation between its segments, the two ends of the bar 205 are at different altitudes. In other words, the bar 205 has a lower end and an upper end. A pressure difference is created between the lower end and the upper end, and between each duct 206.

The pressure sensors 209, which are linked to respective ducts 206, determine the pressure in each duct 206. Alternatively, an inclinometer makes it possible to interpolate the pressure differences inside the ducts 206.

The control unit 212 then evaluates the pressure differences between two ducts 206. Next, the control unit 212 drives the members 211, so as to vary the pressures inside the ducts 206 according to the pressure differences previously evaluated. To that end, the members 211 form a multiplexed network interconnected by a bus 212.1 and 212.2.

For a constant incline angle A204 along the bar 205, the members 211 are driven so as to each generate a sufficient pressure drop to balance the average pressures upstream, in a respective duct 206, and downstream, in a respective conduit 210. The driving of the members 211 is done from measurements by an inclinometer or a respective pressure sensor 209, in particular those situated directly upstream and downstream, and following the calculations done by the control unit 212 indicated by the buses 212.1 and 212.2.

Thus, for example, in the case where the ducts 206 are identical and the bar 205 is rectilinear and banked by an incline angle A204, all of the members 211 restrict their passage sections in very similar proportions, so as to generate the same pressure drop, therefore the same barometric difference between ducts 206, caused by their similar altitude differences. The pressure drops successively generated by each member 211 accumulate from the top of the bar 205 to the bottom, which balances the average pressures between all of the ducts 206.

When the pressures in each duct are equalized among one another, each nozzle 208 or equivalent means sprays a same liquid product flow 202 per unit of the surface 204, for example 120 L/h, despite the variations in the topography of the surface 204.

Advantageously, the cutoff valve 213 situated at the lowest altitude, that on the right in FIG. 4, is closed or practically closed. However, the uppermost cutoff valve 213, i.e., that on the left, is completely open, which facilitates driving of the members 211. When the surface is horizontal, the two cutoff valves are completely reopened.

Figure 5:
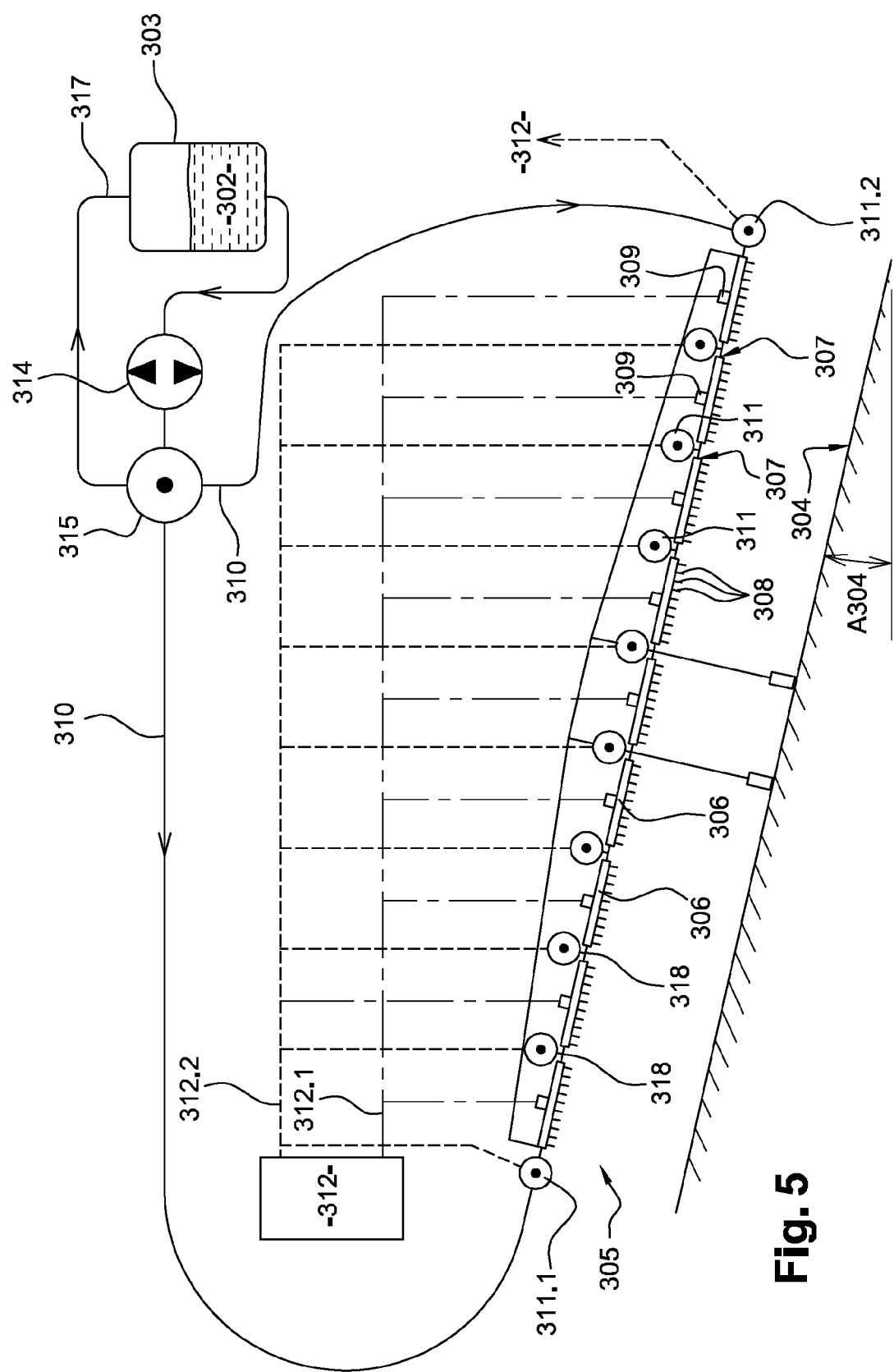
FIG. 5 is an illustration similar to FIG. 1 of a device according to a fourth embodiment of the invention.

FIG. 5 illustrates a device 301 according to a fourth embodiment of the invention. As far as the device 301 is similar to the device 201, the description of the device 201 provided above relative to FIG. 4 can be transposed to the device 301, with the exception of the differences hereafter described. An element of the device 301 that is similar or corresponds, in terms of structure or function, to an element of the device 201 bears the same reference number increased by 300.

One thus defines a liquid product 302, a reservoir 303, a surface 304 with an angle A304, a bar 305, ducts 306, inlets 307, nozzles 308, supply conduits 310, members 311, a control unit 312, a pump 314, a bypass valve 315 and a return conduit 317.

The device 301 differs from the device 201 in that the bar 305 includes restrictors 311.1 and 311.2 arranged at each end of the bar 305, instead of cutoff valves 213. Each member 311.1 or 311.2 is driven by the control unit 312. Each member 311.1 or 311.2 is formed by a flow restrictor similar to the members 311.

The lowest member 311.2 greatly restricts its flow section so as to generate a pressure drop compensating all of the banking A304 of the bar 305, or part of the bar if applicable. In the event the ducts or segments 306 are identical, that pressure drop is at least equal to the sum of the (identical) pressure drops that are generated by all of the other members 311 situated higher up, plus one unit.

In other words, if the bar 305 includes N ducts 306, and therefore (N−1) intermediate members 311, situated between the segments of the bar 305, the control unit 312 drives the lowest member 311.2 such that it creates a pressure drop greater than or equal to N times the pressure drop created by all of the intermediate members 311.

When the surface 304 is horizontal, the members 311.1 and 311.2 are maximally open, since the pressure again becomes practically the same in all of the ducts 306, which can be supplied again with the same flow rates at each end of the bar 305, or each bar portion if applicable.

Furthermore, in the example of FIG. 5, each member 311 has an opening speed greater than the closure speed, for example using driving signals. The control unit drives each member 311 with an opening speed greater than the closure speed, such that the regulation is done as a priority by pressure reduction, then pressure increase only if necessary.

One thus avoids a pressure increase in the device due to a drift or "runaway" of the control unit 312. In other words, to obtain equilibrium of the pressures in all of the ducts 306, the control unit 312 first tries to decrease the pressure in each of them, reducing the pressure drop created by its member 311, before seeking to increase it. Thus, the average pressure in the ducts tends to come as close as possible to the supply pressure in the conduits 310.

According to other embodiments of the invention that are not shown, considered alone or according to any technically allowable combinations:

All of the three functions described above (pressure sensor, flow restrictor, and electronic driving card (i.e. the control unit thus having become individual)), and potentially a fourth function (cutoff of the segment), are brought together in a single location (at the inlet of each duct/segment), and preferably in an integrated member (to reduce costs). This integration allows a significant cost reduction. All of these integrated members are interconnected between them by a same cable, forming a multiplexed network bus and providing electricity. Advantageously, these integrated multifunctional members are arranged directly on the bar, which makes them very easy to adapt to a used bar.

The sensors comprise at least one inclinometer mounted directly on a respective duct, or on the central frame or on at least one of the arms of the bar. In the case of a non-articulated bar, which therefore has a single incline angle relative to the agricultural field, a single inclinometer allows the control unit to determine the pressure in each duct by calculation.

At least two of the type 10 supply ducts are in fluid communication with a same type 11 member, upstream of their own individual cutoff valve, so as to simultaneously vary the pressures inside several ducts, which limits the number of members required.

The number of ducts is comprised between 3 and 30, preferably between 5 and 25.

The number of variable geometry arms is comprised between 2 and 6, preferably equal to 2.

The sensors comprise sensors suitable for determining the height of several respective ducts from the ground.

The control unit is designed to interpret and/or extrapolate the pressure measurements done by sensors installed only at certain selected ducts. In such an alternative, it is not necessary to equip all of the ducts with a sensor.

The bar includes several bar portions, for example two, which are mounted, and therefore powered, in parallel, each bar portion having several ducts connected in series using connecting conduits each connected to two ducts.

If the physical property measured by a sensor establishes that a pressure in a target duct differs abnormally and simultaneously from the pressures in two adjacent ducts (these pressures for example both being higher or both being lower), the control unit generates a signal identifying the target duct so as to inform an operator that a clog may occur in or near the target duct, for example at a filter and/or a nozzle attached on said target duct.

A device according to the invention is associated with a so-called RPA (Rate Proportional to Advance) regulating unit, which regulates the pressure or flow rate to modulate the total flow rate of the sprayed liquid product as a function of the speed of movement of the device on the surface. The control unit regularly calculates the gap between an average value of the pressure measured by each sensor on the one hand, and the pressure caused by said regulating unit on the other hand. The control unit then drives each member so as to keep said gap below a predetermined value.

The invention claimed is:

1. A device for dispensing a liquid product to be sprayed over a surface such as an agricultural field, the device comprising:
   a bar for spraying the liquid product, the bar including several consecutive ducts, each duct forming a longitudinal segment of the bar and having:
   at least one inlet port designed to be in fluid communication with at least one liquid product source; and
   at least one outlet port adapted to be in fluid communication with at least one nozzle,
   wherein the device further comprises:
   several sensors linked to respective ducts, each sensor being configured for measuring a physical property making it possible to determine a pressure difference between two respective ducts or a physical property making it possible to determine respective pressures inside at least two ducts;
   several members designed to vary the pressures inside respective ducts, each member being in fluid communication with at least one inlet port; and
   at least one control unit interconnected with the sensors so as to estimate the pressure differences between at least two ducts, said control unit being interconnected with the members so as to drive them to reduce said pressure differences or equalize said pressures.

2. The device according to claim 1, wherein the control unit is designed to drive the members so as to limit said pressure differences to less than 10%.

3. The device according to claim 1, wherein the sensors comprise pressure sensors attached on respective ducts.

4. The device according to claim 1, wherein the sensors comprise at least one inclinometer.

5. The device according to claim 1, wherein the members comprise members for restricting the flow of the liquid product, such as needle regulators, sliding gate valves, ice sluices or proportional solenoid valves, or hose clamps.

6. The device according to claim 5, wherein at least one flow restricting member includes two discs coaxially juxtaposed, each disc being pierced with an orifice that is asymmetrical relative to the axis of the discs, the discs being rotatable around their shared axis under the action of a driving member, for example an electric motor.

7. The device according to claim 1, wherein each duct is linked to a sensor and each inlet port is in fluid communication with a member.

8. The device according to claim 7, wherein the bar further includes connecting conduits arranged such that two consecutive ducts are connected by a respective connecting duct and such that the connecting conduits form at least one bar portion equipped with several ducts connected in series, the bar including one or more of said bar portions arranged in parallel, and wherein at least one member is arranged between the ducts connected in series.

9. The device according to claim 8, further comprising two supply conduits respectively coupled to the two ducts arranged at each end of the bar or of a bar portion, in that the bar or each bar portion also includes two members or two cutoff valves, each member or cutoff valve being arranged to selectively allow a flow of liquid product in a respective supply conduit or to create a predetermined pressure drop.

10. The device according to claim 1, further comprising several supply conduits designed to be connected in parallel to at least one liquid product source, each supply conduit being in fluid communication with at least one respective member, the member being coupled in the upstream region of a respective supply conduit.

11. The device according to claim 9, wherein at least two supply conduits are coupled to a same member.

12. The device according to claim 1, wherein at least one from among the set of sensors and the set of members forms a multiplexed network interconnected by a bus.

13. The device according to claim 1, wherein each sensor and each member are incorporated into a single and same component, the set of components being interconnected between them by a same cable forming a multiplexed network and providing electricity.

14. The device according to claim 13, wherein said member further incorporates means for cutting the arrival of fluid into the associated duct.

15. A method for dispensing a liquid product to be sprayed over a surface such as an agricultural field, the device comprising a bar for spraying the liquid product, the bar having several consecutive ducts, each duct forming a longitudinal segment of the bar and having:
   at least one inlet port designed to be in fluid communication with at least one liquid product source; and
   at least one outlet port suitable for being in fluid communication with at least one nozzle,
   wherein the method comprises the following steps:
   measuring a physical property making it possible to determine respective pressures inside at least two ducts using several sensors linked to respective ducts;
   estimating the pressure differences between at least two ducts by means of a control unit, which is centralized or specific to each sensor, and which is interconnected with the sensors; and
   varying the pressures inside the respective ducts using members that are respectively in fluid communication with at least one of said inlet ports and which are driven by the control unit as a function of said pressure differences.

16. The method according to claim 15, further comprising the following steps:
   checking whether a pressure at a duct is above a predetermined threshold;
   if said pressure is above the predetermined threshold, driving the member corresponding to said duct normally; and
   if said pressure is below the predetermined threshold, keeping the member corresponding to said duct in its prior state and with a maximum flow section.

17. The method according to claim 15, further comprising the following steps:
   implementing the device wherein the sensors comprise pressure sensors attached on respective ducts,
   associating the device with a pressure or flow regulating unit, designed to modulate the total flow rate of the sprayed liquid product as a function of the forward speed of the device on the surface;
   calculating, regularly and using the control unit, the gap between an average value of the pressure measured by the sensors and the pressure caused by said regulating unit; and
   driving each member so as to keep said gap below a predetermined value.

18. The method according to claim 15, wherein each member is driven with an opening speed greater than the closure speed.

19. The method according to claim 15, further comprising the following step:
   if the physical property measured by a sensor establishes that a pressure inside a target duct differs abnormally and simultaneously from the pressures inside two adjacent ducts, using the control unit to generate a signal identifying the target duct so as to inform an operator that a clog may have occurred in or near the target duct, for example at a filter and/or a nozzle.

* * * * *